United States Patent [19]
Hashimoto

[11] Patent Number: 5,857,552
[45] Date of Patent: Jan. 12, 1999

[54] PLATE MEMBER HAVING RADIALLY EXTENDING SUPPORT PORTIONS FOR A DAMPER DISC ASSEMBLY

[75] Inventor: Yasuyuki Hashimoto, Neyagawa, Japan

[73] Assignee: Exedy Corporation, Neyagawa, Japan

[21] Appl. No.: 788,868

[22] Filed: Jan. 23, 1997

[30] Foreign Application Priority Data

Feb. 16, 1996 [JP] Japan .................................. 8-029548

[51] Int. Cl.⁶ ....................................................... F16D 3/14
[52] U.S. Cl. ........................ 192/213.21; 192/212; 464/68
[58] Field of Search .................................. 192/212, 213, 192/213.2, 213.21, 213.3, 214; 464/66, 68; 192/205, 213.1, 213.11, 213.12, 213.22, 213.31, 214.1

[56] References Cited

U.S. PATENT DOCUMENTS

| | | | |
|---|---|---|---|
| 2,274,174 | 2/1942 | Wemp ..................................... | 192/212 |
| 2,293,781 | 8/1942 | Thelander ............................... | 192/212 |
| 2,321,941 | 6/1943 | Rose ........................................ | 192/205 |
| 4,493,408 | 1/1985 | Negano ............................ | 192/213.3 X |
| 4,848,551 | 7/1989 | Caspar ................................... | 464/68 X |

Primary Examiner—Richard M. Lorence
Assistant Examiner—Ankur Parekh
Attorney, Agent, or Firm—Shinjyu An Intellectual Property Firm

[57] ABSTRACT

The retaining plate (3) is disposed in a clutch disc assembly in which torque is transmitted through a coil spring and is intended for transmitting torque from an input member to the coil spring. The retaining plate (3) is formed with a first window portion (3a). The first window portion (3a) includes a tunnel portion having a convex shape so as the coil spring to be disposed therein. The tunnel portion (21) of the first window portion (3a) is integral with the retaining plate (3) in the radial direction and is formed with the second holes (23) on its circumferentially opposite ends. A circumferential support portion (22) is formed on the circumferentially opposite ends of the tunnel portion (21).

14 Claims, 4 Drawing Sheets

PLATE MEMBER HAVING RADIALLY EXTENDING SUPPORT PORTIONS FOR A DAMPER DISC ASSEMBLY

BACKGROUND OF THE INVENTION

A. Field of the Invention

The present invention relates to a plate member for a damper disc assembly. Specifically, the invention relates to a convex portion of the plate member which is configured to partially house a coil spring which dampens vibration within the damper disc assembly, the convex portion further providing radial strength to the plate member.

B. Description of the Related Art

In general, a clutch disc assembly used in an automotive clutch or the like typically includes an input member which is selectively coupled to a flywheel of an engine for transmission of torque. Such a clutch disc assembly further includes a spline hub connected to the input member via a vibration damper mechanism. The input member is constructed with friction facings which engage the flywheel, and a pair of disc-like plates. The disc-like plates confine and form part of the vibration damper mechanism. The spline hub is usually configured to connect to an input shaft extending from a transmission for rotation therewith. The spline hub is provided with a boss portion to be spline-engaged with a transmission input shaft and a flange extending radially outward from the boss portion. The flange extends between the disc-like plates. Windows are formed in the flange, and spring members such as coil springs are disposed in the windows. The pair of plates are formed with window portions that extend in axial directions and correspond to the windows in the flange. The window portions formed in the pair of plates are typically formed by making circumferentially extending cuts in the plates and then deforming the plates in the area adjacent to the cuts forming the axially extending window portions. The coil springs are disposed in the flange windows and the window portions formed in the pair of plates, thus elastically connecting the plates and the flange. The circumferential ends of the windows and the window portions contact corresponding ends of each of the coil springs to effect torque transmission between the flange and the plates.

In the plate members of the above described clutch assembly, the radially opposite sides of each of the window portions typically include raised portions that may be curved to correspond generally to the shape of the coil springs. The raised portions are not formed so as to be continuous in the radial direction due to the cutting process utilized for forming the window portions. Therefore, the overall mechanical strength of the plate is diminished. Further, during clutch use, the area about each window portion in the plate undergoes frictional wear in response to movement of the coil springs. The degree of the frictional wear around the raised portions is considerable because the area that contacts the coil springs is small.

SUMMARY OF THE INVENTION

An object of the present invention is to provide a plate member of the damper disc assembly in which the location of the window portions remain in the radially outward portion, while maintaining the mechanical strength and the wear-resistance of the window portions of the plate member satisfactory.

In accordance with one aspect of the present invention, a plate member for use in a damper disc assembly includes a plate body configured for connection to a torque input member, the plate body formed with at least one window portion configured to at least partially cover and retain a coil spring within a damper disc assembly, the window portion being radially homogeneously formed with the plate body. The window portion has a tunnel portion having a convex shape that protrudes in an axial direction which conforms generally to the coil spring of the damper disc assembly, the window portion further includes circumferential support portions formed on circumferentially opposite sides of the tunnel portion. The window portion is provided with two stress releiving apertures formed on circumferentially opposite sides thereof.

Preferably, the two stress relieving apertures are formed in the circumferential support portions.

Alternatively, the two stress relieving apertures are formed in the tunnel portion.

Preferably, the two stress relieving apertures are formed in the tunnel portion adjacent to the circumferential support portions.

Preferably, the two stress relieving apertures are formed toward a radially inner side of the tunnel portion.

Preferably, the two stress relieving apertures are formed toward a radially outer side of the tunnel portion.

Preferably, each of the circumferential support portions is formed with circumferentially opposed openings.

Preferably, the tunnel portion is formed with a generally trapezoidal shaped opening.

Preferably, the plate body is further formed with a plurality of apertures for receiving stop pins which fix the plate body to a second plate body.

Preferably, the plate body is further formed with a plurality of the window portions.

Preferably, the plate body is further formed with a plurality of second window portions, the second window portions being smaller than the window portions, the second window portions being generally homogeneously formed with the plate body.

Preferably, the plate body is further formed with a plurality of apertures for receiving stop pins which fix the plate body to a second plate body.

Preferably, the plate body and the second plate body are further configured to engage a plurality of friction generating members such that the plate body and the second plate body are disposed on opposite sides of a hub flange and first and second side plates. The first and second side plates are disposed on opposite sides of the hub flange between the plate body and the second plate body, and one of the friction generating members is disposed between the first side plate and the plate body and another one of the friction generating members is disposed between the second side plate and the second plate body. The friction generating members are configured to generate friction in response to relative rotary displacement between the plate body and the second plate body and the first and second side plates.

Preferably, the plate body is formed with apertures on a radially outward portion thereof which are configured to support a clutch coupling portion.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

FIRST EMBODIMENT

Figure 1:
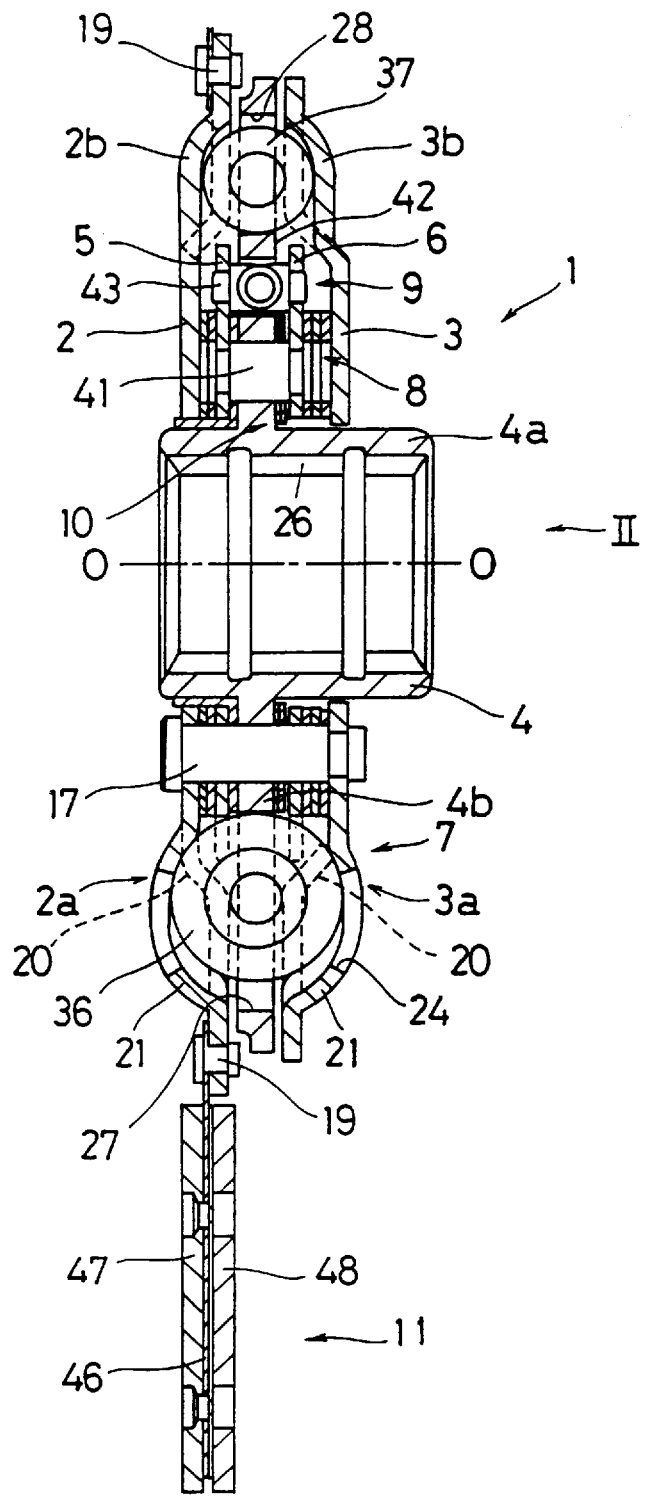
FIG. 1 is a fragmentary, schematic sectional side view showing a clutch disc assembly according to the first embodiment of the present invention.
Figure 2:
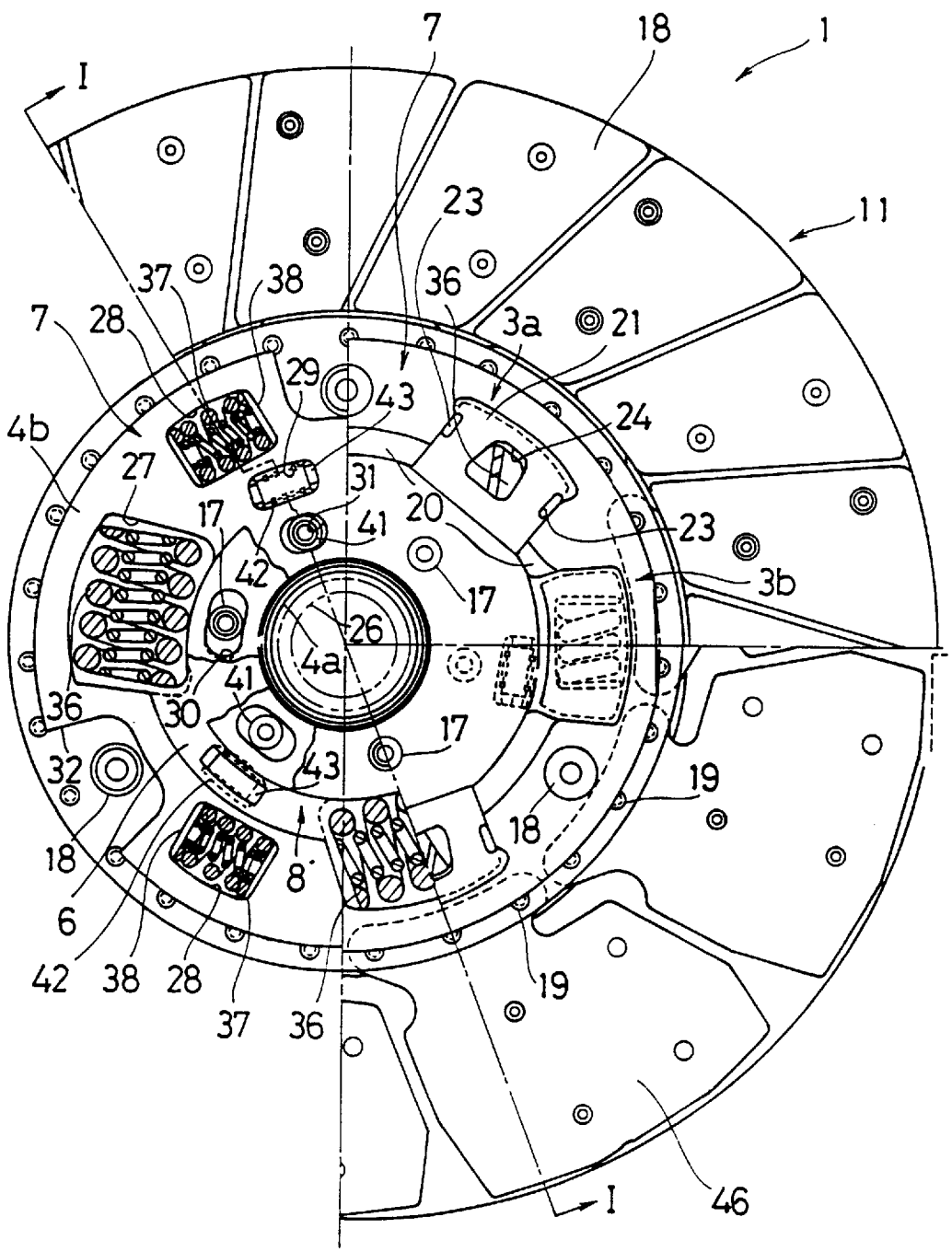
FIG. 2 is a fragmentary, part cut-away, part cross-section end view of the clutch disc assembly depicted in FIG. 1, looking in the direction of the arrow II in FIG. 1.

The present invention will now be described with reference to the accompanying drawings. In FIGS. 1 and 2, there is a shown a clutch disc assembly 1 manufactured in accordance with one embodiment of the present invention. The clutch disc assembly 1 may be used for transmitting a torque from a flywheel (not shown) of an engine to a transmission (not shown). The flywheel and the engine would typically be oriented such that they would be to the left side of the clutch disc in FIG. 1, and the transmission to the right side of the clutch disc assembly 1 in FIG. 1. Hereinafter, the left side of FIG. 1 will be referred to as the engine side and the right side of FIG. 1 will be referred to as the transmission side. In FIG. 1, line 0—0 denotes a central axial line about which the clutch disc assembly 1 may rotate.

The clutch disc assembly 1 includes a clutch plate 2 and a retaining plate 3 which are input members since torque is inputed into the clutch disc assembly 1 via the plates 2 and 3. The clutch disc assembly also includes a spline hub 4, a first side plate 5 and a second side plate 6, a first elastic coupling mechanism 7, a first frictional resistance generating mechanism 8, a second elastic coupling mechanism 9, a second frictional resistance generating mechanism 10 and a clutch coupling portion 11.

As is shown in FIGS. 1 and 2, the clutch plate 2 and the retaining plate 3 are generally annular plates formed with central holes through which the spline hub 4 extends. The clutch plate 2 and the retaining plate 3 are fixed to each other at radially inward positions by first stop pins 17 and at outer radial positions by second stop pins 18 so that the plates 2 and 3 are not rotatable relative to each other. The plates 2 and 3 are made of, for instance, carbon steel material (S35C) or similar materials to provide mechanical strength, and may also be hardened by, for instance, induction hardening and quenching.

First window portions 2a and 3a are formed equidistantly in the circumferential direction at three positions of each plate 2 and 3. One pair of second window portions 2b and 3b is formed between each adjacent pair of the first window portions 2a and 3a, respectively, as is shown in FIG. 2.

Figure 3:
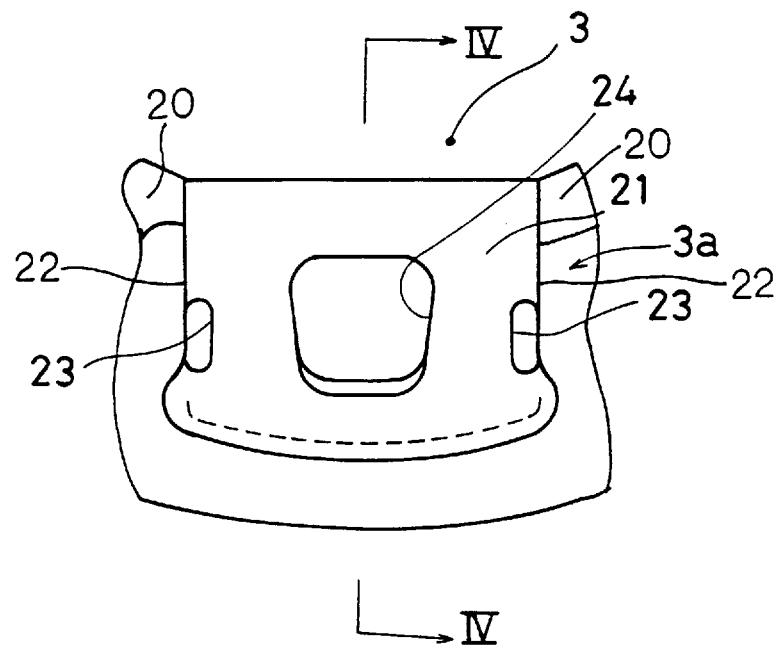
FIG. 3 is a fragmentary view of a portion of FIG. 2, on a slightly enlarged scale.

FIG. 3, only shows the first window portion 2a. The first window portions 2a and 3a are generally the same and are formed using generally the same process and method. The following description of FIG. 3 is applicable to both first window portions 2a and 3a. An annular slanting portion 20 is formed with a radial slant such that the slanting portion 20 is not perpendicular to the line 0—0 in FIG. 1. The slanting portion 20 extends on circumferential intermediate portions of each plate 2 and 3, as is described further below.

The first window portions 2a and 3a and the second window portions 2b and 3b are integrally formed from the slanting portion 20 to the outer circumferential side.

Figure 4:
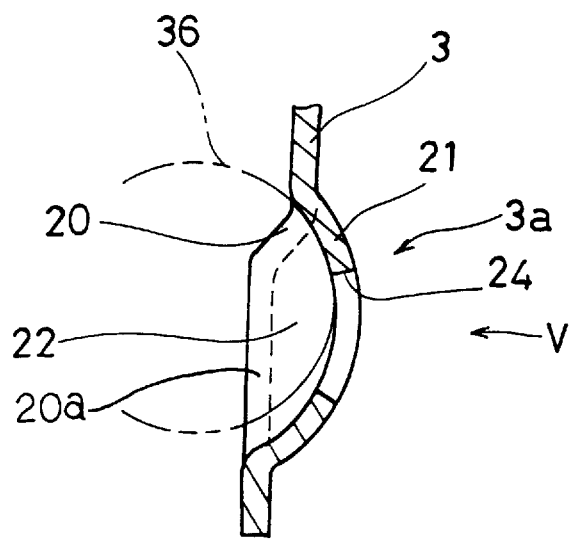
FIG. 4 is a fragmentary, cross-section view of a portion of the clutch disc assembly depicted in FIG. 3, taken along the line IV—IV of FIG. 3.

As best shown in FIG. 3 and FIG. 4, the first window portions 2a and 3a are formed by drawing so that they project outward from the clutch disk assembly 1. Each of the first window portions 2a and 3a includes a tunnel portion 21 which integrally extends in the radial directions and a circumferential support portion 22 which is formed on the opposite sides of the tunnel portions 21. The tunnel portion 21 restricts the axial movement of a first coil spring 36 (described below). A first hole 24 having a generally rectangular shape is formed at the center portion in each of the tunnel portions 21. A side edge of the first hole 24 on the inner circumferential side is longer than a side edge on the outer circumferential side. Second holes 23 which elongate in the radial direction as shown in FIG. 3, are formed in the tunnel portion 21 at the positions adjacent to the boundary of each circumferential support portion 22. The circumferential support portion 22 supports the opposite ends of the first coil spring 36 (described below). The inner side of each circumferential support portions are engaged by springs 36. The springs 36 therefore impart a force on the circumferential support portions 22 which creates a stress concentration in the tunnel portions 21. The second holes 23 provide stress relief in the tunnel portion 21.

An amount of axial projection of the second window portions 3b is smaller than that of the first window portion 3a. There are no holes or the like formed in the second window portion 3b.

A clutch coupling portion 11 is fixed to the outer periphery of the clutch plate 2 by rivets 19. The clutch coupling portion 11 includes a plurality of cushioning plates 46 fixed to the outer peripheral portion of the clutch plate 2 by rivets 19 and frictional facings 47 and 48 fixed on both sides of the cushioning plates 46.

The spline hub 4 includes a main boss 4a and a flange 4b integral with the outer periphery of the boss 4a. The boss 4a is inserted into the central holes of the plates 2, 3. The flange 4b is interposed between the plates 2 and 3. A spline hole 26 to be splined with the input shaft (not shown) extending from a transmission side is formed in the central portion of the boss 4a.

Three first windows 27 extending in the circumferential direction are formed in the flange 4b at the positions corresponding to the first window portions 2a and 3b of the plates 2 and 3. Further, three second windows 28 which are smaller than the first windows 27 are formed in the flange 4b at the positions corresponding to the second window portions 2b and 3b of the plates 2 and 3. Still further, three third windows 29 which are further smaller than the second windows 28 are formed in the flange 4b on the inner circumferential side of the second windows 28. oblong holes 30, through which the first stop pins 17 extend, and short holes 31, through which third stop pins 41 extend (described below) are formed in the inner circumferential side of the third windows 29. Cutaways 32 through which the second stop pins 18 are to pass are formed in the outer circumferential portion of the flange 4b. A predetermined gap is kept in the circumferential direction between each cutaway 32 and the associated second stop pin 18 so that the plates 2 and 3 and the spline hub 4 may undergo limited relative rotation with respect to each other.

Each first elastic coupling mechanism 7 includes three first coil springs 36 and three second coil springs 37. Each of the first coil springs 36 is received in the first window portions 2a and 3a of the plates 2 and 3 and the first window 27 of the flange 4b. The circumferential ends of the first coil spring 36 are supported in the circumferential support portions 22 in the first window portions 2a and 3a. However, a predetermined gap is maintained in the circumferential direction between the first coil spring 36 and the first window 27 of the flange 4b. The second coil spring 37 is smaller than the first coil spring 36 and is received within the space defined by the second window portions 2b and 3b of the plates 2 and 3 and the second window 28 of the flange 4b. Although seat members 38 disposed at opposite ends of the second coil spring 37 are supported in the second window 28 of the flange 4b, a predetermined gap is kept in the circumferential direction between the seat members 38 and the second window portions 2b and 3b of the plates 2 and 3.

Each of the first and second side plates 5 and 6 is a plate member in the form of a disc with a central hole. The first side plate 5 is arranged between the clutch plate 2 and the flange 4b with its central hole engaging the boss 4a. The second side plate 6 is arranged between the retaining plate 3 and the flange 4b with its central hole engaging with the boss 4a. The first side plate 5 and the second side plate 6 are securely fixed to each other without any relative rotation by the three third stop pins 41 in the inner circumferential portions thereof. The third stop pins 41 pass through the short holes 31 of the flange 4b. The outer circumferential portions of the first side plate 5 and the second side plate 6 may be brought into contact with both ends of the first coil springs 36.

The second elastic coupling mechanism 9 is used for elastically coupling the first side plate 5, the second side plate 6 and the flange 4b in the circumferential direction and includes three third coil springs 42. The third coil springs 42 are disposed within the third windows 29 of the flange 4b. Seat members 43 disposed on opposite sides of the third coil springs 42 extend in the axial direction to engage with the first side plate 5 and the second side plate 6.

The first frictional resistance generating mechanism 8 is composed of a plurality of plate members disposed between the first side plate 5 and second side plate 6 and the plates 2 and 3. The second frictional resistance generating mechanism 10 is composed of a plurality of plates disposed between the first side plate 5 and second side plate 6 and the flange 4b.

In the clutch disc assembly 1 having such a structure, when the twist vibration is transmitted from the engine, the first coil springs 36, the second coil springs 37 and the third coil springs 42 are compressed in the rotational direction, and the hysteresis torque due to the friction is generated in the first frictional resistance generating mechanism 8 and the second frictional resistance generation mechanism 10, thereby attenuating the twist vibration.

The first coil springs 36 and the second coil springs 37 are expanded on the outer circumferential side during the compression operation by the centrifugal force and slide along the inside of the first window portions 2a and 3a and the second window portions 3b and 2b of the plates 2 and 3. When the first coil springs 36 slide along the inside of the first window portions 2a and 3a of the plates 2 and 3, since the sliding area between the tunnel portions 21 of the first windows 2a and 3a and the first coil spring 36 is larger compared to the prior art, so that the surface pressure per square unit of measurement is also less than that in the prior art and thus the wear due to friction is minimized.

In forming the first window portions 2a and 3a by drawing, the disc are previously bored to form the first holes 24 and the second holes 23. Since the circumferential length on the inner circumferential side of the second holes 24 is larger than the circumferential length on the outer circumferential side of the second holes 24, the reduction in the plate thickness on the outer circumferential side of the tunnel portions 21 may be suppressed during the drawing process. Since the outer circumferential sides of the tunnel portions 21 are parts where the first coil springs 36 are most likely to slide, the durability may be enhanced by the suppression of the plate thickness reduction.

Since the second holes 23 are formed, the stress concentration is hardly caused on the outer circumferential side of the first window portions 21. Since the position of the second holes 23 is radially further inner side compared to that in the prior art, the mechanical strength of the outer circumferential portion of the plate body is not degraded when the first window portions 21 are conventionally located on the outer circumferential side of the plate. Further, the material is fully extended due to the second holes 23, thereby restraining the crack occurrence.

Figure 5:
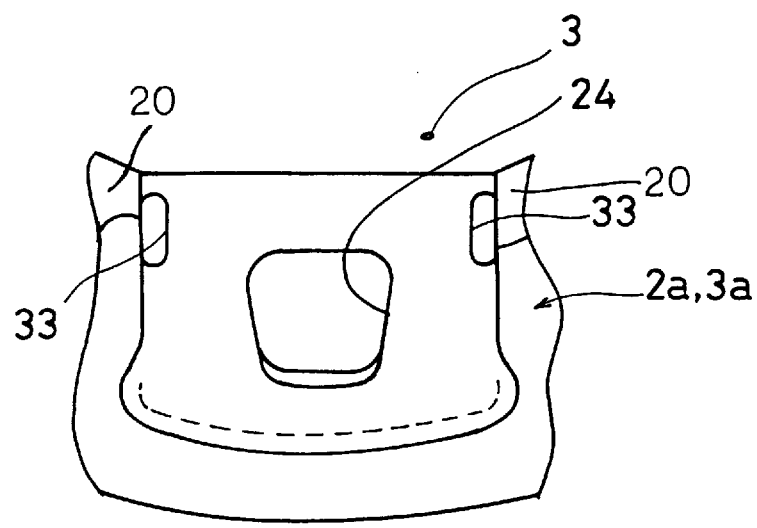
FIG. 5 is a view similar to FIG. 3, showing a modification to the first embodiment of the present invention.

As shown in FIG. 5, the second holes 33 may be located on further inner side in the radial direction compared to that in the first embodiment. Furthermore, the number, the position and the shape of the second holes are not limited to the one shown in FIG. 3 or FIG. 5.

SECOND EMBODIMENT

Figure 6:
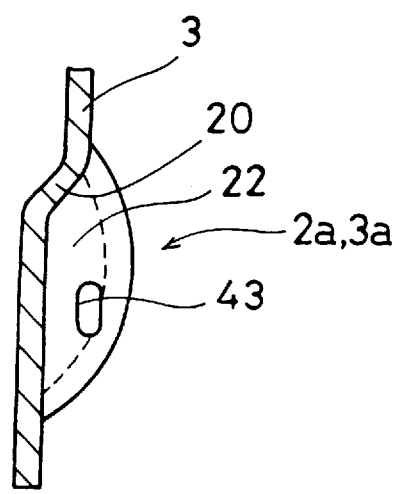
FIG. 6 is a view similar to FIG. 4 showing a portion of a clutch disc assembly in accordance with a second embodiment of the present invention.

As shown in FIG. 6, the second holes 43 may be formed on the circumferential support portion 22. In this case, the same effect as in the previous preferred embodiment is attained. The number, the position and the shape of the second holes formed on the circumferential support portion are not limited to the one shown in FIG. 6.

According to the present invention, since holes are formed in the circumferential portions or the axial support portions of the plate members, the stress concentration is hardly caused in the outer circumferential side of the window portion. Further, the holes are located on further inner side in the radial direction compared to that in the prior art, the mechanical strength of the outer circumferential portion of the plate body is not degraded when the window portions are conventionally located on the outer circumferential side of the plate.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A plate member for use in a damper disc assembly, the plate member comprising:

a plate body formed from a plate material configured for connection to a torque input member, said plate body formed with at least one window portion configured to at least partially cover and retain a coil spring within a damper disc assembly, said window portion being homogeneously formed with said plate body from said plate material such that said window extends generally continuously along said plate body in a radial direction relative to said plate body, said window portion having a tunnel portion having a convex shape that protrudes in an axial direction relative to said plate body, said tunnel portion conforming generally to said coil spring of the damper disc assembly, said window portion further formed with circumferential support portions formed on circumferentially opposite sides of said tunnel portion; and wherein said window portion is provided with two stress relieving apertures formed on circumferentially opposite sides thereof, said two stress relieving apertures being formed in said circumferential support portions.

2. The plate member as in claim 1, wherein said tunnel portion is also formed with a central generally trapezoidal shaped opening.

3. The plate member as in claim 1, wherein said plate body is further formed with a plurality of apertures for receiving stop pins which fix said plate body to a second plate body.

4. The plate member as in claim 1, wherein said plate body is further formed with a plurality of said window portions.

5. The plate member as in claim 4, wherein said plate body is further formed with a plurality of second window portions, said second window portions being smaller than said window portions, said second window portions being generally homogeneously formed with said plate body from said plate material such that said second window portions extends generally continuously along said plate body.

6. The plate member as in claim 5, wherein said plate body is further formed with a plurality of apertures for receiving stop pins which fix said plate body to a second plate body.

7. The plate member as in claim 1, wherein said plate body is formed with apertures on a radially outward portion thereof which are configured to support a clutch coupling portion.

8. A plate member for use in a damper disc assembly, the plate member comprising:

a plate body formed from a plate material configured for connection to a torque input member, said plate body formed with at least one window portion configured to at least partially cover and retain a coil spring within a damper disc assembly, said window portion being homogeneously formed with said plate body from said plate material such that said window extends generally continuously along said plate body in a radial direction relative to said plate body, said window portion having a tunnel portion having a convex shape that protrudes in an axial direction relative to said plate body, said tunnel portion conforming generally to said coil spring of the damper disc assembly, said window portion further formed with circumferential support portions formed on circumferentially opposite sides of said tunnel portion; and wherein said window portion is provided with two stress relieving apertures formed on circumferentially opposite sides thereof, said two stress relieving apertures are formed in said tunnel portion adjacent to said circumferential support portions.

9. The plate member as in claim 8, wherein said two stress relieving apertures are formed toward a radially inner side of said tunnel portion.

10. The plate member as in claim 8, wherein said two stress relieving apertures are formed toward a radially outer side of said tunnel portion.

11. The plate member as in claim 8, wherein said tunnel portion is also formed with a central generally trapezoidal shaped opening.

12. The plate member as in claim 8, wherein said plate body is further formed with a plurality of apertures for receiving stop pins which fix said plate body to a second plate body.

13. The plate member as in claim 8, wherein said plate body is further formed with a plurality of said window portions.

14. The plate member as in claim 8, wherein said plate body is further formed with a plurality of apertures for receiving stop pins which fix said plate body to a second plate body.

* * * * *